United States Patent [19]

Shapiro et al.

[11] 4,415,101

[45] Nov. 15, 1983

[54] INCREMENTAL LIQUID DISPENSING DEVICE

[76] Inventors: Justin J. Shapiro, 620 Hearst Ave., Berkeley, Calif. 94710; Bruce R. MacDermott, 2835 Prince St., Berkeley, Calif. 94705

[21] Appl. No.: 341,649

[22] Filed: Jan. 22, 1982

[51] Int. Cl.$^3$ .............................................. G01F 11/06

[52] U.S. Cl. .................................... 222/288; 222/391; 74/128; 604/209

[58] Field of Search ............... 222/283, 287, 288, 289, 222/309, 391; 604/209, 210, 224; 74/128, 130

[56] References Cited

U.S. PATENT DOCUMENTS

| | | | |
|---|---|---|---|
| 2,695,023 | 11/1954 | Brown | 604/210 |
| 3,141,583 | 7/1964 | Mapel et al. | 222/391 |
| 3,161,323 | 12/1964 | Bent | 222/391 |
| 3,517,668 | 6/1970 | Brickson | 222/309 |

*Primary Examiner*—H. Grant Skaggs

*Attorney, Agent, or Firm*—Herman L. Gordon

[57] ABSTRACT

A liquid repetitive dispensing device consisting of a main body containing an elongated square ratchet bar slidably engaged with the main body, the ratchet bar having two adjacent longitudinal faces having ratchet teeth of different pitch. A push button is provided in the main body having an inclined bore containing a spring-biased pawl drivingly engageable with the ratchet teeth responsive to inward movement of the push button. An abutment bushing surrounds and conformably receives the ratchet bar and is adjustably rotatably received in the main body. The bushing is formed with inclined bottom cam surfaces extending toward the ratchet teeth and being engageable by the pawl. The degree of driving engagement of the pawl with the teeth is in accordance with the axially adjusted position of the bushing. A yieldable detent in the main body is selectively receivable in axially spaced recesses in the bushing to lock it in adjusted position relative to the main body. The main body has a bracket with pairs of spaced lugs for frictionally connecting it to the barrel of a syringe, and the top end of the ratchet bar has a handle bar with a transversely grooved outer end and spaced lower lugs for connecting the top of the ratchet bar to the syringe plunger. The ratchet bar has a bottom cylindrical portion receivable in a square bore in the bottom portion of the main body when the ratchet bar is elevated to its uppermost position for filling the syringe. The bushing is yieldably held against rotation, but can be manually rotated to cause the ratchet bar to be rotated so as to change the ratchet teeth engageable by the pawl and thereby to vary the basic dispensing rate. Axial adjustment of the bushing varies the pitch multiple available, whereby at least four different dispensing rates may be provided.

13 Claims, 9 Drawing Figures

INCREMENTAL LIQUID DISPENSING DEVICE

FIELD OF THE INVENTION

This invention relates to liquid dispensing devices, and more particularly to syringe devices for repeatedly dispensing precisely the same incremental liquid volume until the liquid supply is exhausted.

BACKGROUND OF THE INVENTION

An ordinary syringe has no means for positively accurately and automatically dispensing repeated identical volumes of liquid. There are presently known special types of repeating dispensers designed for this purpose, such as the dispenser disclosed in U.S. Pat. No. 3,161,323 to J. H. Bent. Such a dispensing device employs a toothed ratchet bar which is drivingly connected to the dispensing plunger and which is moved incrementally through equal dispensing steps by a reciprocatory push button drivingly coupled to a pawl. In such a dispenser there is at present no practical way to change the volumetric dispensing rate except by changing the toothed ratched bar, namely, by substituting a new ratchet bar with a tooth pitch corresponding to the desired new repetitive dispensing rate. This requires the provision of a different ratchet bar for each particular dispensing rate. There is a definite need for a repeating dispensing syringe which can provide two or more repetitive dispensing rates with the same ratchet bar. Also, there is a need for an attachment for an ordinary syringe which can be employed for dispensing accurately identical volumes, and wherein two or more repetitive dispensing rates can be provided by the same attachment without requiring the use of different ratchet bars.

SUMMARY OF THE INVENTION

The present invention comprises a device, which when attached to an ordinary syringe, will upon each actuation of a push button on the device, deliver the same incremental volume until the syringe is emptied. Provision is made for selecting two basic incremental volumes and also for dispensing definite multiples of each of the two basic volumes selected. Changes of the dispensing volume can be made in a simple manner without requiring any substitution of parts and without requiring a high degree of mechanical skill.

Accordingly, a main object of the invention is to provide an improved repeating liquid dispenser device which overcomes the deficiencies and disadvantages of the previously known repeating dispensers.

A further object of the invention is to provide an improved repeating dispenser device which can be adjusted in a simple manner to provide two or more different dispensing rates without requiring any additional or substitute parts.

A still further object of the invention is to provide an improved repeating dispensing attachment for an ordinary syringe which can be easily operatively engaged on the syringe and which can provide two or more different repetitive dispensing rates.

A still further object of the invention is to provide a syringe operator which is of the pawl and ratchet type and which is adjustable to provide two or more stepwise identical-volume dispensing rates, using the same ratchet bar, the adjustment being easy to accomplish and involving no complicated techniques or any special tools.

A still further object of the invention is to provide an improved push button-actuated repeating syringe device which is of the pawl and ratchet type having a ratchet bar and which is provided on different faces thereof with respective ratchet tooth arrays of different pitch, defining respective basic dispensing volumes, and which is arranged so that the ratchet bar is rotatably adjustable for employing selected toothed faces of the bar for cooperation with its pawl, to thereby provide a selected basic volumetric dispensing rate, and which is further provided with means to selectively control the effective length of the pawl stroke so as to deliver a specific multiple of the basic dispensing rate, thereby making available for selection at least four different incremental volumetric delivery rates, without requiring any substitution of parts in the overall assembly.

BRIEF DESCRIPTION OF THE DRAWINGS

Further objects and advantages in the invention will become apparent from the following description and claims, and from the accompanying drawings, wherein:

DETAILED DESCRIPTION OF A PREFERRED EMBODIMENT

Figure 1:
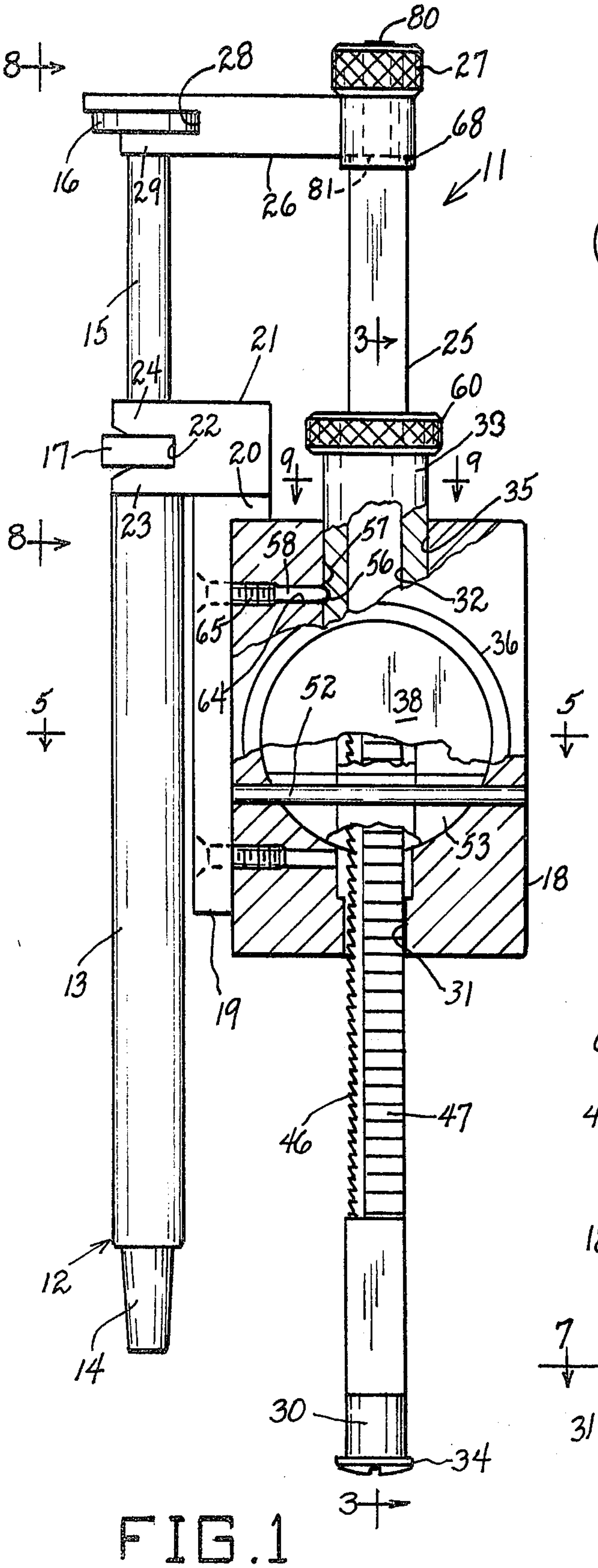
FIG. 1 is a front elevational view, partly in vertical cross-section, showing a dispensing attachment according to the present invention operatively connected to an ordinary syringe and forming a stepwise incremental liquid dispensing device with multiple volumetric adjustment capability.

Referring to the drawings, 11 generally designates an improved repeating dispensing attachment constructed in accordance with the present invention. In FIG. 1 attachment 11 is shown operatively connected to a conventional syringe 12 having a cylindrical barrel 13 provided with a bottom discharge conduit 14. The syringe has a plunger 15 provided with a top flange 16. The top rim portion of barrel 13 is conventionally formed with a pair of oppositely extending gripping lugs 17, 17.

The dispensing attachment 11 comprises a main body 18, which may be generally rectangular in shape, as shown, having an angle bracket 19 rigidly secured to one side thereof, said bracket having a top flange 20. Rigidly secured on top flange 20 is a substantially rectangular block 21. Block 21 has an outwardly facing transverse groove 22 and is formed with lower lugs 23, 23 spaced to receive barrel 13 therebetween (see FIG. 8) and with upper lugs 24, 24 spaced to receive plunger 15 therebetween, whereas the gripping lugs 17, 17 are tightly received between the respective pairs of lugs 24, 23 defined by the transverse groove 22, whereby the barrel 13 is frictionally clampingly and detachably secured to body 18 via the bracket 19.

Figure 8:
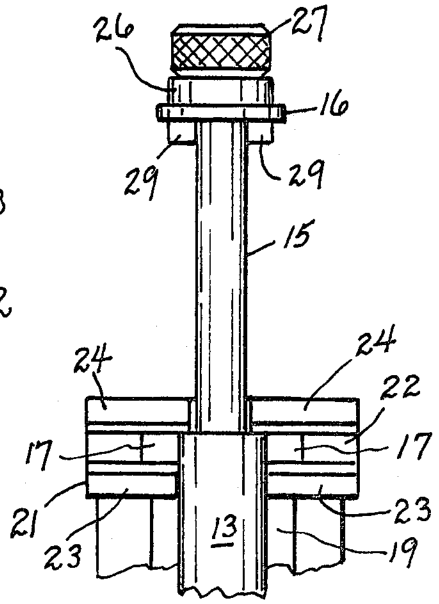
FIG. 8 is a fragmentary side elevational view taken substantially on the line 8—8 of FIG. 1.

A toothed drive bar 25 extends through body 18. A handle bar 26 has an inner end boss 68 with a central bore receiving a stud 80 on the top end of square bar 25 and having a transverse bottom groove 81 non-rotatably receiving said square bar top end. Boss 68 is clamped in interlocked relation with groove 81 by a clamping nut 27 threadedly engaged on stud 80. The outer end portion of handle bar 26 is formed with a transverse groove 28 and with spaced lower lugs 29, 29 between which plunger 15 is receivable when flange 16 is received in groove 28, as shown in FIGS. 1 and 8. This provides a driving connection between plunger 15 and the top end of ratchet bar 25.

The ratchet bar 25 is of square cross-sectional shape except for a small bottom cylindrical portion 30 with a diameter approximately equal to the width of the sides of the bar 25. The function of the short cylindrical bottom end portion 30 is to at times allow rotation of the bar, as will be presently described. Normally, bar 25 is held against rotation by being slidably and conformably engaged through a square bore 31 in the bottom wall portion of body 18 and through the square bore 32 of an adjustable abutment bushing 33 which is itself rotatably mounted in a bore 35 in body 18 but is normally locked against rotation relative to said body in a manner presently to be described. A stop screw 34 is threadedly secured in the bottom end of ratchet bar 25, said screw having an enlarged head engageable with the bottom surface of body 18 to limit upward movement of bar 25 to the position shown in FIG. 3.

Figure 3:
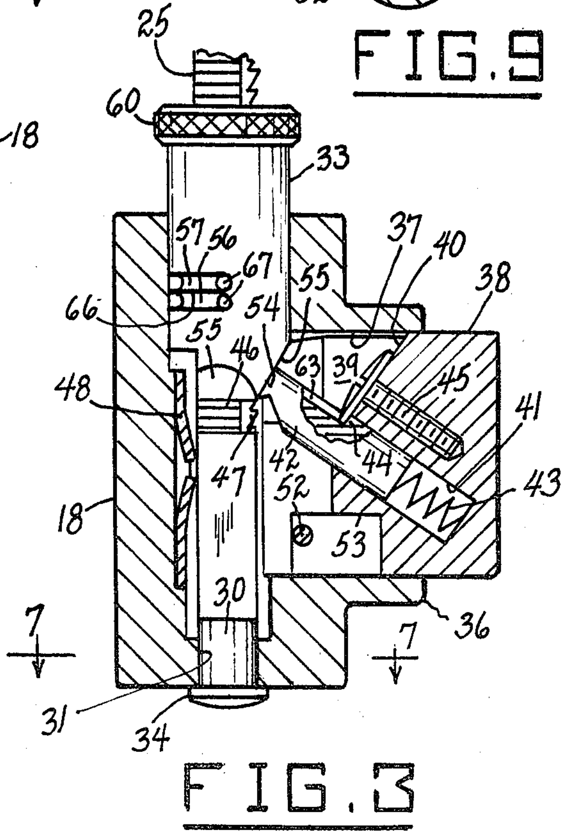
FIG. 3 is a transverse vertical cross-sectional view taken substantially on the line 3—3 of FIG. 1, but showing the driving ratchet bar in its uppermost initial operating position.
Figure 5:
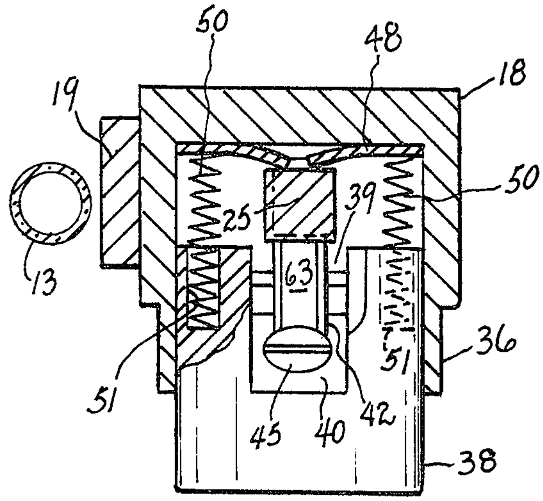
FIG. 5 is a horizontal cross-sectional view taken substantially on the line 5—5 of FIG. 1.
Figure 4:
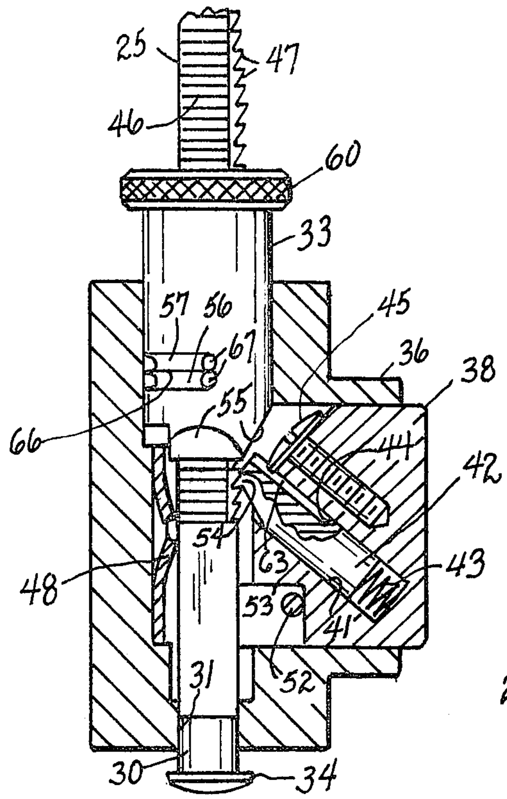
FIG. 4 is a vertical cross-sectional view similar to FIG. 3 but showing the actuating push button at the inner end of its first dispensing stroke.

Body 18 is formed with a large laterally extending hollow boss 36 communicating with a lateral bore 37 in which is slidably mounted a push button 38. Said push button is formed with an inner central groove or recess 39 having an inclined end wall surface 40 (see FIGS. 3, 5 and 6) and with a cylindrical bore 41 extending perpendicularly to surface 40. Slidably and non-rotatably mounted in bore 41 is a cylindrical pawl 42 urged outwardly by a coiled spring 43 in the bottom of bore 41. Pawl 42 is formed with a stop shoulder 44 engageable with the enlarged head of a stop screw 45 threadedly secured in the push button recess 39 parallel and adjacent to cylindrical bore 41, as shown in FIGS. 3 and 4, to limit the outward extension of pawl 42. Stop shoulder 44 is defined by the bottom end of a longitudinal recess 63 formed in pawl 42, slidably and conformably interengageable with the enlarged head of stop screw 45 and preventing rotation of pawl 42 in cylindrical bore 41.

Ratchet bar 25 is provided on adjacent faces thereof with respective ratchet teeth 46, 47 of different pitch. For example, the teeth 47 may have substantially larger pitch than the teeth 46.

Figure 6:
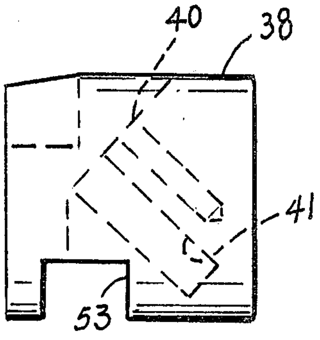
FIG. 6 is a side elevational view of the actuating push button employed in the dispensing attachment of FIG. 1.
Figure 7:
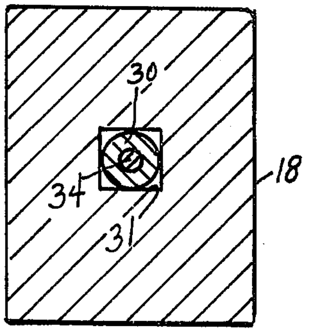
FIG. 7 is a horizontal cross-sectional view taken substantially on the line 7—7 of FIG. 3.

Bore 37 defines a cavity in body 18 through which ratchet bar 25 extends. Said ratchet bar is yieldably frictionally held against free movement by a leaf spring 48 bearing between ratchet bar 25 and the inner wall of said cavity opposite push button 38. Said push button is biased laterally outwardly from the cavity by coil springs 50, 50 (see FIG. 5) mounted in recesses 51, 51 and bearing against the side marginal portions of spring 48. Axial movement of the push button is limited by a transverse stop pin 52 secured in body 18 and extending through a transverse rectangular tunnel-shaped recess 53 formed in the bottom portion of push button 38, as shown in FIG. 6. The limiting outward position of push button 38 is shown in FIG. 3, wherein the left end wall of tunnel 53 engages stop pin 52, whereas the limiting inward position of said push button is shown in FIG. 4, wherein the right end wall of tunnel 53 engages pin 52.

Pawl 42 is provided with an end hook-like catch element 54 which normally slidably enages on a flat inclined camming abutment surface 55 formed on the bottom end of bushing 33 and which leads to the ratchet teeth 47, as shown in FIG. 3. A similar inclined abutment camming surface 55 on bushing 33 leads to the ratchet teeth 46. When push button 38 is pushed inwardly from the normal position of FIG. 3 to the final position of FIG. 4, the catch element 54 travels a relatively short distance downwardly along the adjacent cam surface 55, then engages a ratchet tooth 47, and drives the ratchet bar 28 downwardly through a relatively long stroke, for example, twice the pitch distance of teeth 47, before reaching the limiting position of FIG. 4. This stroke can be halved by correspondingly downwardly adjusting the set position of the abutment bushing 33. For this purpose, bushing 33 is formed with a pair of circumferential grooves 57, 56, one above the other, forming a ridge 66 and extending about 90° around the periphery of the bushing opposite the pawl 42, as viewed in FIG. 3. A pin 58 is located in the non-threaded portion of a partially threaded hole 64, held by a screw 65, defines clamping means to lockingly engage in a selected peripheral groove 57 or 56. When the pin 58 is lockingly engaged in the lower groove 56 there is minimum travel downwardly of catch element 54 along the adjacent cam surface 55 and maximum downward stroke of ratchet bar 25. When the pin 58 is lockingly engaged in the upper groove 57 of the bushing 33, said bushing is in its lowered position and there is maximum downward travel of the catch element along the adjacent cam surface 55 and a smaller resultant downward stroke of ratchet bar 25, for example, only for a single tooth pitch distance. This assumes no rotational adjustment of the position of ratchet bar 25.

Figure 2:
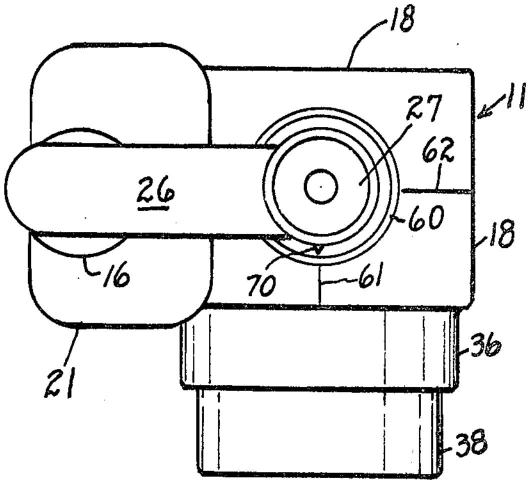
FIG. 2 is a top plan view of the dispensing assembly of FIG. 1.
Figure 9:
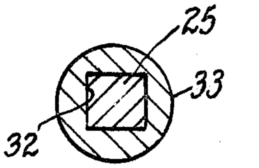
FIG. 9 is a horizontal cross-sectional view taken substantially on line 9—9 of FIG. 1.

In the arrangement illustrated in FIG. 1, the bar 25 is oriented so that the larger-pitched teeth 47 are engageable by the pawl 42, thereby providing larger incremental dispensed volumes when push button 38 is actuated. Additionally, pin 58 is lockably engaged in groove 56, thereby providing that the greater resultant downward stroke of ratchet bar 25 will be achieved when push button 38 is actuated. Smaller dispensed incremental volumes may be obtained by rotationally adjusting the ratchet bar 25 so that the smaller-pitch teeth 46 face the pawl 42. This adjustment is accomplished by first pulling the handle 26 upwardly to the fully elevated position of ratchet bar 25 shown in FIG. 3, wherein cylindrical portion 30 is in the square bore 31. Nut 27 is then loosened sufficiently to allow the boss structure 68 on handle 26 to clear the end of ratchet bar 25, and the bushing 33 and bar 25 are then manually rotated 90°, employing a knurled gripping flange 60 on bushing 33, in a counterclockwise direction, as viewed in FIG. 2. This moves the smaller teeth 46 and the associated bushing camming surface 55 to positions facing pawl 42, and pin 58 seats in a detent recess 67 provided at the appropriate end of groove 56. The device is then ready to dispense twice the smaller incremental base rate. To dispense at a single, smaller incremental rate, the bushing 33 is pushed downwardly to press pin 58 over ridge 66 between grooves 57, 56 and reseat pin 58 in the detent 67 at the appropriate end of groove 57. The pin 58 is comprised of material sufficiently yieldable resiliently under compression to clear ridge 66 when a moderate pressure is applied to bushing 33. To dispense at the smallest basic incremental rate, pin 58 is clampingly engaged in the upper groove 57, namely, with the bushing 33 in its lowermost set position, whereas to dispense at twice the smallest rate, the pin 58 may be clampingly engaged in the lower bushing groove 56, namely, with the bushing in its uppermost set position.

Therefore, it is apparent that the structural arrangement above described gives a choice of four incremental dispensing rates without requiring any substitution of parts, namely:

a. The smallest basic incremental rate, by employing the smallest-pitch teeth 46, with the bushing 33 clamped in its lower set position.
b. Twice the smallest basic rate, with bushing 33 clamped in its upper set position.
c. The larger basic incremental rate, by employing the larger-pitch teeth 47, with the bushing 33 clamped in its lower set position.
d. Twice the larger basic rate, with the bushing 33 clamped in its upper set position.

Suitable index marks 61, 62, cooperating with a pointer 70 on flange 60, may be provided on the top surface of body 18 to indicate the specific rotated position of ratchet bar 25.

In a typical practical embodiment, the device was designed to dispense 20, 25, 40, and 50 ml per operation of the push button 38. Using the smaller-pitch teeth 46, the 20 and 40 ml incremental step volumes were available, with the bushing 33 set respectively in its lowered and upper positions. Using the larger-pitch teeth 47, the 25 and 50 ml incremental step volumes were available, with the bushing 33 set respectively in its lowered and upper positions.

The dispensing assembly is filled with liquid by first pushing down the handle 26 to move the plunger 15 to its lowermost position in barrel 13, for example, to a position similar to that shown in FIG. 1. The syringe 12 is then suitably inserted into the liquid and the device is held stationary while the handle is elevated so as to raise the ratchet bar 25 to its upper limiting position, as shown in FIG. 3. The barrel 13 is thus filled with the liquid to be dispensed, and it can be dispensed in the incremental quantities desired by successively pushing the push button 38 inwardly through its full inward dispensing stroke and then releasing it for its next dispensing stroke. FIG. 4 illustrates the lowered position of the ratchet bar 25 at the end of the first inward dispensing stroke of push button 38.

It will be noted that the catch element 54 is normally in abutment with a sloping cam surface 55. When the push button 38 is pushed inwardly the catch element is constrained to move downwardly along the cam surface 55 as the pawl 42 is forced to descend in the inclined bore 41, which is at an angle of about 35° to the horizontal. After the catch element 54 leaves the cam surface 55 it is still constrained to move downwardly, interlocked now with a ratchet tooth, until push button 38 reaches its inward limiting position, namely, with the rightward end wall of tunnel 53 in abutment with the stop pin 52, as shown in FIG. 4. The downward dispensing movement of ratchet bar 25 occurs between the interlocking of catch element 54 with a ratchet tooth and the engagement of the rightward end wall of tunnel 53 with the stop pin 52.

While a specific embodiment of an improved incremental liquid dispensing device has been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiment.

What is claimed is:

1. A liquid repetitive dispensing device comprising a main body, an elongated ratchet bar, means slidably and rotatably supporting said ratchet bar in said main body, means to operatively connect a liquid dispensing syringe between said main body and said ratchet bar, said ratchet bar having at least two angularly spaced longitudinal ratchet faces with ratchet teeth of different pitch, and actuating member movably connected to said main body, pawl means movably mounted in said main body and extending toward said ratchet bar, means operatively coupling said actuating member to said pawl means, means constraining said pawl means to drivingly engage said ratchet teeth responsive to movement of said actuating member, and means for selectively securing said ratchet bar in either of two rotated positions in said main body wherein said pawl means is operatively engageable with one ratchet face in a first rotated position of said ratchet bar and with the other ratchet face in a second rotated position in said main body, and wherein said means for selectively securing the ratchet bar includes bushing means slidably and non-rotatably receiving the ratchet bar and rotatably mounted in said main body, and means to fixedly clamp the bushing means to the main body in a selected rotated position of the bushing means.

2. The liquid dispensing device of claim 1, and longitudinally adjustable abutment means in the main body adjacent the ratchet bar engageable by the pawl means to vary the degree of driving engagement of the pawl means with the ratchet teeth.

3. The liquid dispensing device of claim 2, and wherein the abutment means is formed so that in a first adjusted position of said abutment means the driving engagement of the pawl means is limited to the pitch distance between the ratchet teeth and in a second adjusted position is limited to a multiple of said pitch distance.

4. The liquid dispensing device of claim 2, and wherein said adjustable abutment means is provided with an inclined cam surface engageable by said pawl means and sloping toward the ratchet teeth.

5. The liquid dispensing device of claim 2, and wherein said adjustable abutment means comprises inclined cam surfaces on said bushing means engageable by said pawl means and sloping toward said ratchet teeth.

6. The liquid dispensing device of claim 1, and wherein said bushing means has angularly spaced detent recesses and wherein said means to fixedly clamp the bushing means comprises a detent element in the main body selectively engageable in said angularly spaced recesses.

7. The liquid dispensing device of claim 1, and wherein said means slidably and rotatably supporting said ratchet bar includes means defining a non-circular bore portion in said main body conformably and non-rotatably receiving the ratchet bar, said ratchet bar having a cylindrical portion rotatably received in said noncircular bore portion when the ratchet bar is moved to the end of its syringe-filled stroke, whereby to allow rotation of the ratchet bar.

8. The liquid dispensing device of claim 1, and wherein said means constraining the pawl means is shaped to move the pawl means rectilinearly and downwardly relative to the actuating means responsive to manual force exerted on the actuating means.

9. A liquid repetitive dispensing device comprising a main body, an elongated ratchet bar, means slidably and rotatably supporting said ratchet bar in said main body, means to operatively connect a liquid dispensing syringe between said main body and said ratchet bar, said ratchet bar having at least two angularly spaced longitudinal ratchet faces with ratchet teeth of different pitch, an actuating member movably connected to said main body, pawl means movably mounted in said main body and extending toward said ratchet bar, means operatively coupling said actuating member to said pawl means, means constraining said pawl means to drivingly engage said ratchet teeth responsive to movement of said actuating member, and means for selectively securing said ratchet bar in either of two rotated positions in said main body wherein said pawl means is operatively engageable with one ratchet face in a first rotated position of said ratchet bar and with the other ratchet face in a second rotated position in said main body, wherein said actuating means comprises a push button slidably mounted in said main body, and wherein said pawl means comprises a spring-biased pawl slidably mounted in an inclined bore formed in said push button, said bore being oriented so as to generate downward motion of said pawl responsive to inward movement of said push button.

10. The liquid dispensing device of claim 9, and camming abutment means in the main body slidably engaged by said pawl and constraining said pawl to move downwardly during an inward stroke of said push button.

11. The liquid dispensing device of claim 10, and wherein said abutment means comprises a bushing rotatably and slidably received in said main body and slidably but non-rotatably receiving said ratchet bar, and means to adjust the longitudinal position and the rotated position of the bushing relative to said main body.

12. A liquid repetitive dispensing device comprising a main body, an elongated ratchet bar slidably engaged in said main body, means to operatively connect a liquid dispensing syringe between said main body and said ratchet bar, said ratchet bar having a longitudinal array of evenly spaced ratchet teeth, an actuating member movably connected to said main body, pawl means movably mounted in said main body and extending toward and being drivingly engageable with said array of ratchet teeth, means operatively coupling said actuating member to said pawl means, means constraining said pawl means to drivingly engage said ratchet teeth responsive to movement of said actuating member, and longitudinally adjustable abutment means in the main body adjacent the ratchet bar engageable by the pawl means to vary the degree of driving engagement of the pawl means with the ratchet teeth, wherein said abutment means comprises a bushing member in the main body surrounding said ratchet bar, said bushing member having a camming abutment surface adjacent the ratchet teeth and being engageable by said pawl means, and means to adjust the axial position of the bushing member along the ratchet bar, and wherein said position adjusting means comprises an inwardly projecting detent element in the main body, said bushing member having a plurality of axially-spaced locking recesses and said detent element being selectively clampingly engageable in said locking recesses.

13. The liquid dispensing device of claim 12, and wherein said camming surface slopes downwardly toward said ratchet teeth.

* * * * *